(12) United States Patent
Sakamoto et al.

(10) Patent No.: US 10,733,705 B2
(45) Date of Patent: Aug. 4, 2020

(54) INFORMATION PROCESSING DEVICE, LEARNING PROCESSING METHOD, LEARNING DEVICE, AND OBJECT RECOGNITION DEVICE

(71) Applicant: HONDA MOTOR CO., LTD., Minato-ku, Tokyo (JP)

(72) Inventors: Yosuke Sakamoto, Wako (JP); Umiaki Matsubara, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 62 days.

(21) Appl. No.: 16/226,767

(22) Filed: Dec. 20, 2018

(65) Prior Publication Data

US 2019/0197669 A1 Jun. 27, 2019

(30) Foreign Application Priority Data

Dec. 27, 2017 (JP) .................................. 2017-252177

(51) Int. Cl.
*G06T 5/00* (2006.01)
*G06N 20/00* (2019.01)
(Continued)

(52) U.S. Cl.
CPC .......... *G06T 5/001* (2013.01); *G06K 9/00208* (2013.01); *G06K 9/00805* (2013.01);
(Continued)

(58) Field of Classification Search
CPC ....... G06T 5/001; G06T 5/006; G06T 3/0018; G06T 3/20; G06T 7/11;
(Continued)

(56) References Cited

U.S. PATENT DOCUMENTS 7,613,357 B2 * 11/2009 Owechko ................. G06K 9/46
382/190
9,607,358 B2 * 3/2017 Takenaka ........... H04N 5/23238
(Continued)

FOREIGN PATENT DOCUMENTS

JP 2007-328631 12/2007
JP 2008-015979 1/2008
(Continued)

OTHER PUBLICATIONS

Japanese Office Action for Japanese Patent Application No. 2017-252177 dated Sep. 3, 2019.

*Primary Examiner* — Michael S Osinski
(74) *Attorney, Agent, or Firm* — Amin, Turocy & Watson, LLP (57) ABSTRACT

An information processing device, a learning processing method, a learning device and an object recognition device capable of improving learning processing accuracy are provided. An information processing device causes a computer to generate a distortion-corrected equivalent image on the basis of a first captured image including a subject having predetermined distortion generated due to optical operations during imaging, to generate first teacher data in which relevant information about the target object has been added for the equivalent image in which an image region for the target object has been designated, to convert the equivalent image included in the first teacher data into a distorted image having predetermined distortion to generate second teacher data and to generate a learning model which outputs a result obtained by identifying the target object included in the second captured image when the second captured image having predetermined distortion generated therein is input, on the basis of the second teacher data.

8 Claims, 5 Drawing Sheets

(51) Int. Cl.
  *G06T 7/11* (2017.01)
  *G06K 9/00* (2006.01)
  *G06K 9/62* (2006.01)
(52) U.S. Cl.
  CPC .......... *G06K 9/6254* (2013.01); *G06K 9/6264* (2013.01); *G06N 20/00* (2019.01); *G06T 7/11* (2017.01); *G06T 2207/20081* (2013.01)
(58) Field of Classification Search
  CPC .......... G06T 2207/20081; G06T 2207/30252; G06N 20/00; G06K 9/00208; G06K 9/00805; G06K 9/6254; G06K 9/6264; G06K 9/42; G06K 9/46; G06K 9/00771; G06K 9/00818; G06K 9/00798; H04N 5/23238; H04N 5/217; H04N 5/3572; H04N 5/2628; H04N 5/2259; H04N 19/124; H04N 19/167; H04N 19/17
  See application file for complete search history.

(56) References Cited

U.S. PATENT DOCUMENTS

| | | | |
|---|---|---|---|
| 10,237,495 B2* | 3/2019 | Yoshizawa | G06T 7/11 |
| 10,269,092 B2* | 4/2019 | Yoshimi | G02B 27/0037 |
| 2005/0259118 A1* | 11/2005 | Mojaver | H04N 5/2628 345/647 |
| 2007/0065014 A1* | 3/2007 | Owechko | G06K 9/46 382/190 |
| 2011/0128377 A1* | 6/2011 | Katz | H04N 5/3572 348/143 |
| 2015/0193914 A1* | 7/2015 | Kuwata | H04N 7/15 348/14.08 |
| 2016/0284064 A1* | 9/2016 | Morofuji | H04N 5/23238 |
| 2017/0206670 A1* | 7/2017 | Miyasa | G06K 9/4604 |
| 2017/0236291 A1* | 8/2017 | Balley | H04N 9/73 348/144 |
| 2017/0251208 A1* | 8/2017 | Adsumilli | H04N 19/597 |
| 2017/0347030 A1* | 11/2017 | Guerreiro | G06T 5/006 |
| 2018/0040153 A1* | 2/2018 | Tanigawa | G06T 11/60 |
| 2019/0012766 A1* | 1/2019 | Yoshimi | G06T 3/0018 |
| 2019/0130215 A1* | 5/2019 | Kaestle | G06K 9/00771 |
| 2019/0139449 A1* | 5/2019 | Zhang | G09B 19/14 |
| 2019/0370609 A1* | 12/2019 | Akiyama | G06K 9/00805 |

FOREIGN PATENT DOCUMENTS

| | | |
|---|---|---|
| JP | 2016-171526 | 9/2016 |
| JP | 2018-026104 | 2/2018 |
| WO | 2017/182225 | 10/2017 |

* cited by examiner

INFORMATION PROCESSING DEVICE, LEARNING PROCESSING METHOD, LEARNING DEVICE, AND OBJECT RECOGNITION DEVICE

CROSS-REFERENCE TO RELATED APPLICATION

Priority is claimed on Japanese Patent Application No. 2017-252177, filed Dec. 27, 2017, the content of which is incorporated herein by reference.

BACKGROUND

Field of the Invention

The present invention relates to an information processing device, a learning processing method, a learning device, and an object recognition device.

Description of Related Art

Recently, research on automatic vehicle control has progressed. In automatic vehicle control, it is important to recognize objects around a vehicle in real time as the vehicle travels. For example, research and practical application with respect to a technique of recognizing objects around a vehicle using an image captured by a camera mounted in the vehicle have progressed. With respect to this technique, a technique of recognizing an object using a learning model prepared in advance on the basis of images captured by a camera mounted in a vehicle and updating the learning model using the captured images as is as images for learning is known (refer to Japanese Unexamined Patent Application, First Publication No. 2007-328631, for example).

It is also important to widen a recognition range of a recognition device and to improve the accuracy of recognition of the surroundings of a vehicle in automatic vehicle control. For example, the recognition range may be widened by using a wide-angle lens. An image of an object near a vehicle rather than a distant object is magnified by using a fisheye lens to improve object recognition accuracy.

SUMMARY

However, in captured images captured using such lenses, subjects may be distorted due to optical operations. Accordingly, there are cases in which the learning processing accuracy decreases in conventional techniques because captured images having distortion as is are used as images for learning.

An object of aspects of the present invention devised in view of the aforementioned circumferences is to provide an information processing device, a learning processing method, a learning device, and an object recognition device capable of improving learning processing accuracy.

An information processing device, a learning processing method, a learning device, and an object recognition device according to the present invention employed the following configurations.

(1): An information processing device according to one aspect of the present invention causes a computer to: generate a distortion-corrected equivalent image on the basis of a first captured image including a subject having predetermined distortion generated due to optical operations during imaging; generate first teacher data in which relevant information about a target object has been added for the equivalent image in which an image region for the target object has been designated; convert the equivalent image included in the first teacher data into a distorted image having predetermined distortion to generate second teacher data; and generate a learning model which outputs a result obtained by identifying the target object included in a second captured image when the second captured image having predetermined distortion generated therein is input, on the basis of the second teacher data.

(2): In the aspect of (1), the first captured image and the second captured image are images captured by an imager including a fisheye lens.

(3): In the aspect of (1), the information processing device further causes the computer to surround the image region of the target object with a rectangular frame to designate the image region corresponding to the target object.

(4): In the aspect of (3), the information processing device further causes the computer to convert the equivalent image included in the first teacher data into the distorted image and to convert the shape of the rectangular frame into a shape having distortion according to the position on the equivalent image at which the rectangular frame has been designated when the second teacher data is generated.

(5): A learning processing method according to one aspect of the present invention is executed by a computer and includes: generating a distortion-corrected equivalent image on the basis of a first captured image including a subject having predetermined distortion generated due to optical operations during imaging; generating first teacher data in which relevant information about a target object has been added for the equivalent image in which an image region for the target object has been designated; converting the equivalent image included in the first teacher data into a distorted image having predetermined distortion to generate second teacher data; and generating a learning model which outputs a result obtained by identifying the target object included in a second captured image when the second captured image having predetermined distortion generated therein is input, on the basis of the second teacher data.

(6): A learning device according to one aspect of the present invention includes: an image corrector which generates a distortion-corrected equivalent image on the basis of a first captured image including a subject having predetermined distortion generated due to optical operations during imaging; a first teacher data generator which generates first teacher data in which relevant information about a target object has been added for the equivalent image in which an image region for the target object has been designated; a second teacher data generator which converts the equivalent image included in the first teacher data into a distorted image having predetermined distortion to generate second teacher data; and a learning model generator which generates a learning model which outputs a result obtained by identifying the target object included in a second captured image when the second captured image having predetermined distortion generated therein is input, on the basis of the second teacher data.

(7): An object recognition device according to one aspect of the present invention recognizes an object using a learning model generated by a computer which generates a distortion-corrected equivalent image on the basis of a first captured image including a subject having predetermined distortion generated due to optical operations during imaging, generates first teacher data in which relevant information about a target object has been added for the equivalent image in which an image region for the target object has been designated, converts the equivalent image included in the first teacher data into a distorted image having predetermined distortion to generate second teacher data, and generates the learning model which outputs a result obtained by identifying the target object included in a second captured image when the second captured image having predetermined distortion generated therein is input, on the basis of the second teacher data.

(8): In the aspect of (7), the object recognition device further includes a recognizer which recognizes the target object included in a third captured image captured by an imager in which the predetermined distortion is generated on the basis of the third captured image having distortion that has not been corrected.

According to the aspects (1) to (8), learning processing accuracy can be improved.

DESCRIPTION OF EMBODIMENTS

Hereinafter, embodiments of an information processing device, a learning processing method, a learning device and an object recognition device of the present invention will be described with reference to the drawings.

Learning Processing Device

Figure 1:
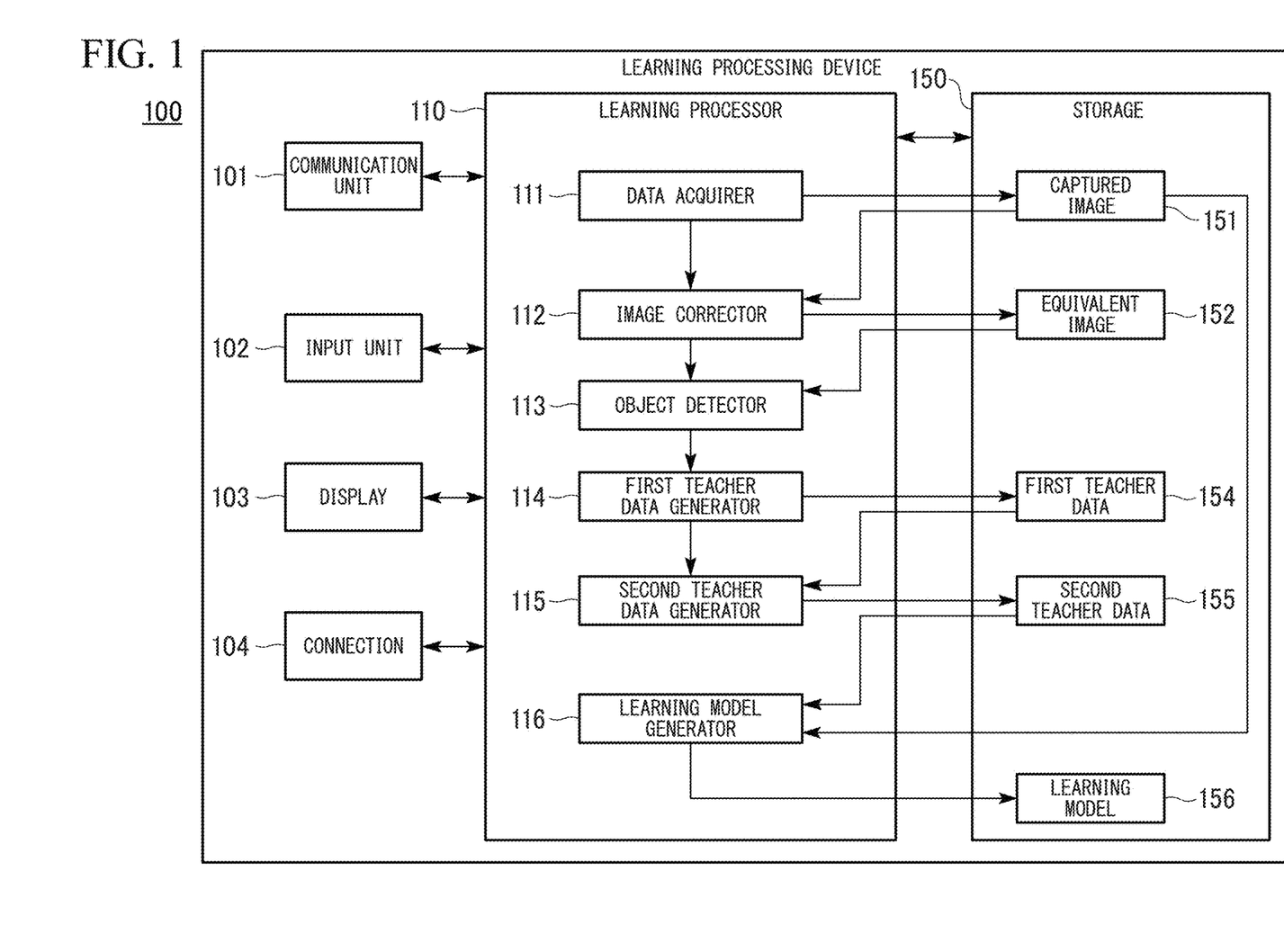
FIG. 1 is a block diagram of a learning processing device according to an embodiment.

FIG. 1 is a block diagram of a learning processing device 100 according to an embodiment. The learning processing device 100 is a device for generating a learning model on the basis of a captured image. For example, the learning processing device 100 includes a communication unit 101, an input unit 102, a display 103, a connection 104, a learning processor 110, and a storage 150.

For example, the communication unit 101 includes a communication interface such as a network interface card (NIC). The input unit 102 is a keyboard, a mouse and the like. The display 103 is a liquid crystal display (LCD) and the like. The connection 104 is hardware for connecting the learning processing device 100 to an external device and is a USB connector and the like, for example. The storage 150 is a flash memory such as a random access memory (RAM), a read only memory (ROM) or a solid state drive (SSD), a hard disk drive (HDD), and the like.

The storage 150 stores a captured image 151, an equivalent image 152, first teacher data 154, second teacher data 155, a learning model 156 and the like, for example. The captured image 151 is data of a captured image captured by a predetermined camera and input data used when a learning model is generated. A captured image is an image which is captured by a camera including a wide-angle lens and a fisheye lens, for example, and has predetermined distortion therein. The predetermined distortion is determined in advance according to lens type. The equivalent image 152, the first teacher data 154, the second teacher data 155 and the learning model 156 are information generated by the learning processor 110 and will be described in description of the learning processor 110.

The learning processor 110 includes a data acquirer 111, an image corrector 112, an object detector 113, a first teacher data generator 114, a second teacher data generator 115 and a learning model generator 116, for example. These components are realized by executing a program (software) through a hardware processor such as a central processor (CPU), for example. Some or all of these components may be realized using hardware (circuit unit including circuitry) such as a large scale integration (LSI) device, an application specific integrated circuit (ASIC), a field-programmable gate array (FPGA) and a graphics processor (GPU) or realized by cooperation between software and hardware.

The data acquirer 111 stores information received from external devices using the communication unit 101 and information input from external devices connected through the connection 104 in the storage 150. For example, the data acquirer 111 stores image data of a captured image received (or input) from an external device in the storage 150 as the captured image 151.

The image corrector 112 generates an image (hereinafter referred to as an equivalent image because distortion has been corrected but a compression ratio is close to being equal) obtained by correcting distortion of the captured image on the basis of the captured image 151 and stores the image in the storage 150 as the equivalent image 152. Various methods can be used for a process of correcting distortion of a captured image. For example, distortion of a captured image can be corrected using information representing a correspondence relationship (compression ratio and the like) between pixels obtained in advance.

The object detector 113 detects a target object from an equivalent image generated by the image corrector 112. The object detector 113 detects a target object included in an equivalent image on the basis of information representing image characteristics of the target object which have been determined in advance, for example. Target objects include structures such as buildings and signs, pedestrians (adults, children, the aged and the like may be distinguished), animals, and the like, for example. The object detector 113 outputs a detection result to the first teacher data generator 114.

The first teacher data generator 114 executes annotation on the basis of the detection result of the object detector 113 and generates the first teacher data. Annotation is a process of designating an image region including a target object included in an image (setting a frame surrounding the target object, for example), generating annotation information and associating the annotation information with the image. The annotation information is relevant information about the target object included in the designated image region and includes type labels, meta information, intra-image position information, and the like, for example. Details of the annotation information described here are an example, and all of this information may not be provided according to annotation, and some information may be appropriately added or deleted. The type labels are information representing types of object and the like.

For example, types of object include a building, a person, a vehicle, and the like. With respect to the type labels, more detailed particulars may be set for each object type and information representing a color, shape, size, height, sex, age, vehicle type and the like of objects may be included, for example. The meta information is information representing an imaging environment (weather, a place and the like), imaging conditions such as a lens type, diaphragm and shutter speed, and the like, for example. The intra-image position information is information representing the position of a designated image region with respect to the inside of an entire image and includes information representing four corners of a set frame, a frame ID and the like, for example.

For example, the first teacher data generator 114 designates an image region including a target object included in an image by setting a frame at a position surrounding the image region including the target object. When a plurality of target objects are detected, the first teacher data generator 114 may set a plurality of frames for one equivalent image. Hereinafter, an equivalent image for which a frame has been set will be represented as a framed equivalent image. The shape of the frame is a rectangle or a figure close to a rectangle, for example. Figures close to a rectangle include figures having sides facing each other which are parallel to each other, adjacent sides which are perpendicular to each other, and corners having a rounded shape, and the like. Hereinafter, an image region surrounded by a frame will be referred to as an object image region. The first teacher data generator 114 sets a frame on an equivalent image such that the frame includes all target objects and the area of an object image region is minimized, for example. The first teacher data generator 114 generates first teacher data associated with annotation information for the framed equivalent image and stores the first teacher data in the storage 150 as the first teacher data 154.

Processes such as the process of detecting a target object performed by the object detector 113 and annotation performed by the first teacher data generator 114 may be performed by a person. For example, the processes may be performed by an operator setting a frame to surround a target object on an equivalent image using the input unit 102, inputting information corresponding to annotation information using the input unit 102, and the like.

The second teacher data generator 115 generates second teacher data which is teacher data used when a learning model is generated. The second teacher data generator 115 stores the generated second teacher data in the storage 150 as the second teacher data 155. For example, the second teacher data generator 115 converts the framed equivalent image included in the first teacher data having the annotation information added thereto into an image having predetermined distortion (hereinafter, referred to as a distorted image) to generate the second teacher data. That is, the second teacher data is data having a distorted image to which the annotation information has been added. The predetermined distortion generated in the distorted image is the same as distortion generated in a captured image. When the framed equivalent image is converted into the image having distortion, the second teacher data generator 115 converts the shape of the frame set on the framed equivalent image into a shape having distortion according to a position in the framed equivalent image which is the same as distortion of the distorted image.

When a captured image in which predetermined distortion has been generated is input according to machine learning, the learning model generator 116 generates a learning model which outputs a result obtained by identifying an object included in the captured image. The learning model generator 116 generates a learning model on the basis of the captured image 151 and the second teacher data 155 stored in the storage 150. With respect to learning model generation methods, various methods can be used. For example, when deep learning is employed, the learning model generator 116 generates a learning model by setting a neuron structure having a plurality of layers in advance and searching for an optimal parameter through a method such as back propagation. The learning model generator 116 stores the generated learning model in the storage 150 as the learning model 156.

Object Recognition Device

Figure 2:
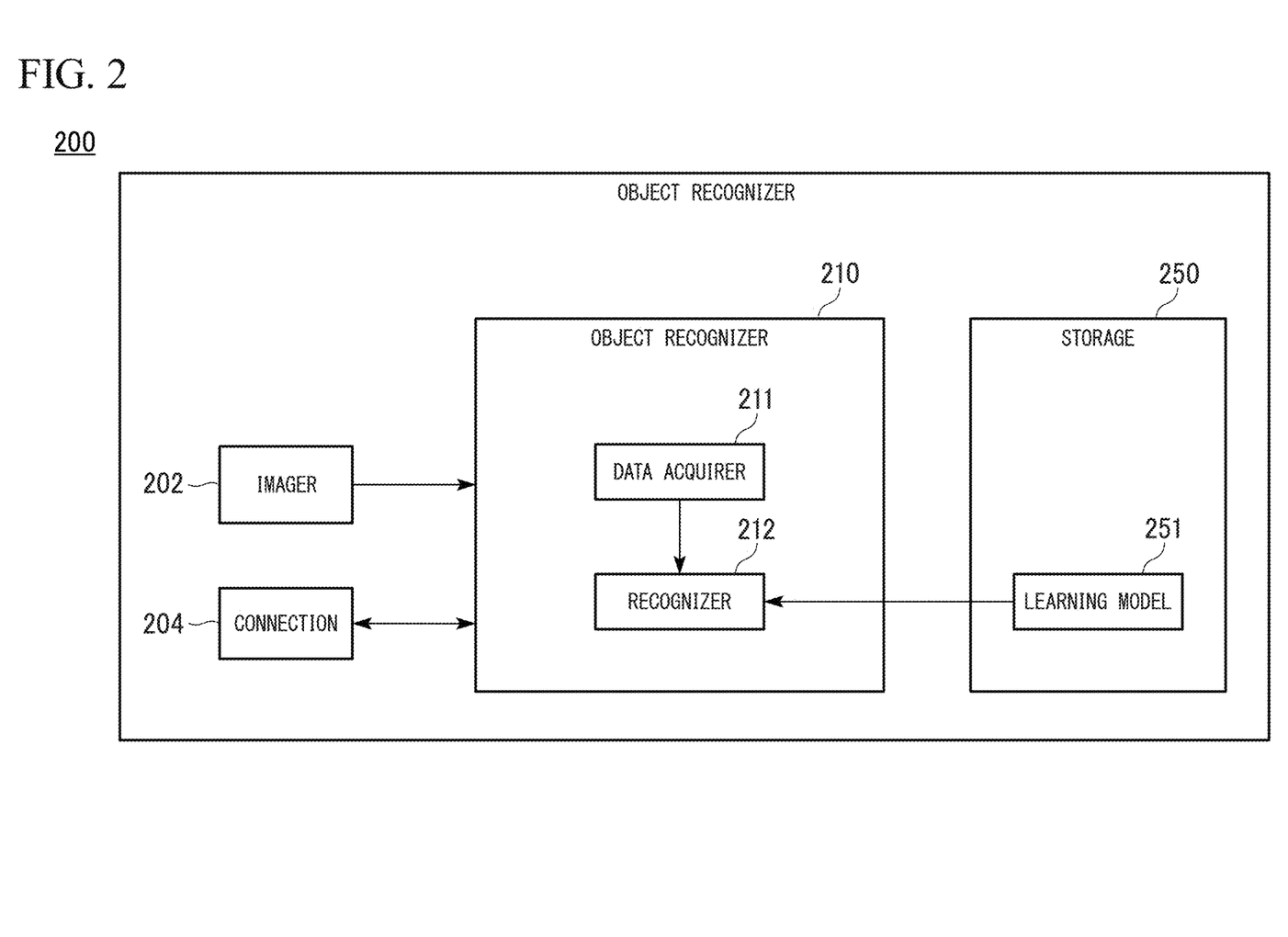
FIG. 2 is a block diagram of an object recognition device according to an embodiment.

FIG. 2 is a block diagram of an object recognition device 200 according to an embodiment. The object recognition device 200 is a part of a vehicle onboard unit mounted in a vehicle, for example. The object recognition device 200 includes an imager 202, a connection 204, an object recognizer 210 and a storage 250, for example.

The imager 202 captures a distorted image and includes a wide-angle lens and a fisheye lens, for example. The imager 202 is the same type as the camera which captures a captured image, which is used to generate a learning model in the learning processing device 100, for example. The imager 202 outputs captured image data obtained through imaging to the object recognizer 210. The connection 204 is hardware which connects the object recognition device to an external device. The storage 250 is a flash memory such as a RAM, a ROM or an SSD, an HDD or the like. For example, the storage 250 stores the learning model 251 and the like.

For example, the object recognizer 210 includes a data acquirer 211 and a storage 212. These components are realized by a hardware processor such as a CPU executing a program (software), for example. A part or all of these components may be realized by hardware (including a circuit unit; circuitry) such as an LSI device, an ASIC, an FPGA and a GPU or may be realized by cooperation of software and hardware. The data acquirer 211 stores a learning model input from an external device connected through the connection 204 in the storage 150 as the learning model 251. The data acquirer 211 outputs captured image data output from the imager 202 to the recognizer 212.

The recognizer 212 performs an object recognition process based on the captured image data output from the imager 202 using the learning model. That is, the recognizer 212 recognizes a target object included in a captured image on the basis of a captured image having distortion that has not been corrected.

Flowchart of Learning Process

Figure 3:
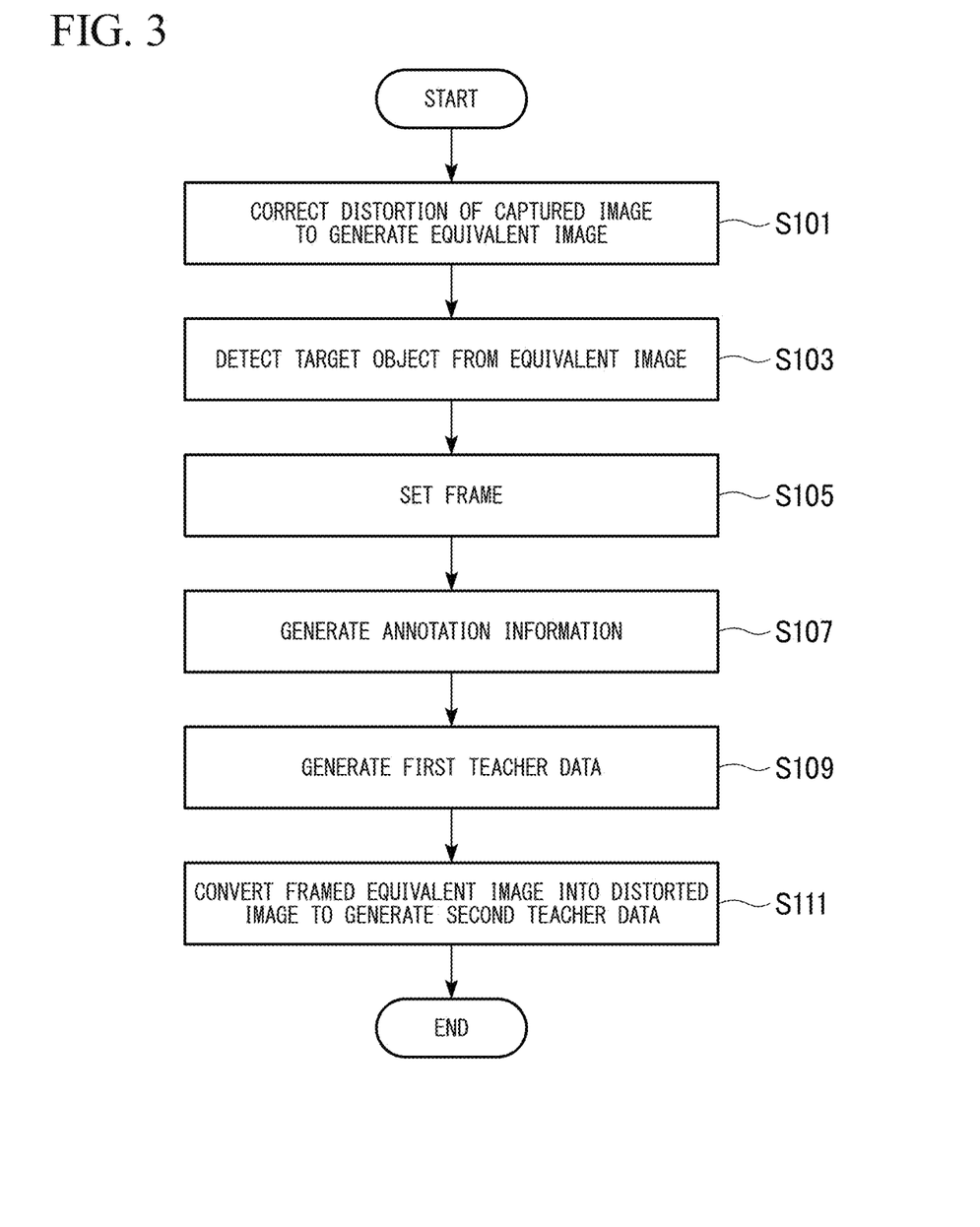
FIG. 3 is a flowchart showing an example of a processing flow performed by the learning processing device.
Figure 4:
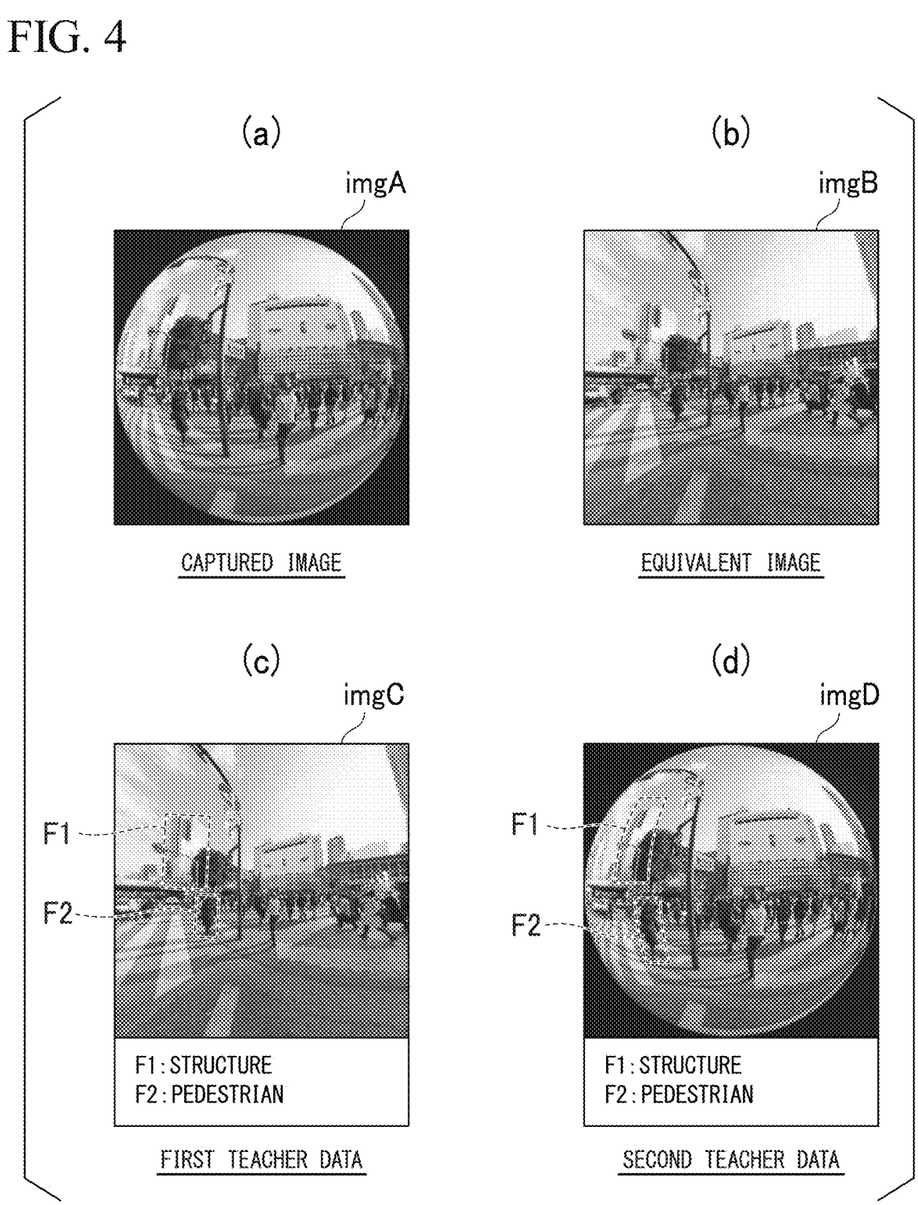
FIG. 4 is a diagram showing examples of images used for processing performed by the learning processing device.

Hereinafter, an example of a processing flow performed by the learning processing device 100 will be described with reference to FIG. 3. FIG. 3 is a flowchart showing an example of a processing flow performed by the learning processing device 100. Images used for a process performed by the learning processing device 100 will also be described with reference to FIG. 4. FIG. 4 is a diagram showing examples of images used for a process performed by the learning processing device 100. It is assumed that a plurality of captured images have been stored in the storage 150 with respect to the following process.

First, the image corrector 112 reads one capture image from the storage 150 and corrects distortion of the read captured image to generate an equivalent image (step S101). For example, the image corrector 112 may correct distortion for a captured image imgA shown in FIG. 4(a) to generate an equivalent image imgB shown in FIG. 4(b).

Subsequently, the object detector 113 detects a target object from the equivalent image and outputs a detection result to the first teacher data generator 114 (step S103). For example, the object detector 113 detects a structure and a pedestrian from the captured image imgA as target objects. Then, the first teacher data generator 114 sets a frame F1 on the structure detected by the object detector 113 and sets a frame F2 on the detected pedestrian as an equivalent image imgC shown in FIG. 4(c) (step S105). Although an example in which frames are set for one structure and one pedestrian has been shown in the illustration, frames may be set for all target objects.

Subsequently, the first teacher data generator 114 generates a type label indicating each target object detected by the object detector 113, meta information representing an environment and the like when the captured image imgA has been photographed, and intra-image position information representing coordinate values of the four corners of the set frames F1 and F2 (step S107). The first teacher data generator 114 adds the generated type label, meta information, intra-image position information and the like (i.e., annotation information) to the framed equivalent image imgC for which the frames F1 and F2 have been set in step S105 to generate first teacher data (step S109).

Subsequently, the second teacher data generator 115 converts the framed equivalent image included in the first teacher data into a distorted image having distortion to generate second teacher data (step S109). For example, the second teacher data generator 115 converts the framed equivalent image imgC shown in FIG. 4(c) into a distorted image imgD having distortion shown in FIG. 4(d) with the annotation information added thereto, to generate the second teacher data (step S111).

According to the above-described learning processing device 100 of the present embodiment, it is possible to improve learning processing accuracy by including: the image corrector 112 which corrects distortion of a first captured image including a subject having the predetermined distortion generated due to optical operations during imaging to generate an equivalent image; the first teacher data generator 114 which generates first teacher data in which relevant information about a target object has been added to the equivalent image on which an image region of the target object included in the image has been set; the second teacher data generator 115 which converts the equivalent image included in the first teacher data generated by the first teacher data generator 114 into a distorted image having the predetermined distortion to generate second teacher data in which the relevant information has been added to the distorted image; and the learning model generator 116 which outputs a result obtained by identifying an object included in the second captured image on the basis of the second teacher data when the second captured image having the predetermined distortion is input to generate a learning model.

When the object detector 113 (or a person) performs the process of setting a frame, it is difficult to set a rectangular frame because a target object has been also distorted in a distorted image. However, it is possible to easily set a rectangular frame by using an equivalent image after being corrected.

A process of correcting distortion for images captured using a fisheye lens, a wide-angle lens and the like is not performed when an object is recognized using a generated learning model, and thus a recognition speed when an object is recognized can be improved.

As shown in FIG. 4(c) and (d), when the equivalent image is compared with the distorted image, an object (e.g., a pedestrian) present near the center in the distorted image is larger than that in the equivalent image. On the other hand, an object (e.g., a structure) present near the outer side in the distorted image is thinner and longer than that in the equivalent image. In this manner, even the same target image in the two images has different shapes and pixel sizes. Accordingly, it is possible to improve recognition accuracy of the object recognition device 200 by generating a learning model on the basis of the second teacher data compared to a case in which a learning model is generated on the basis of the first teacher data based on an equivalent image. Particularly, it is possible to improve pedestrian recognition accuracy.

The above-described embodiment can be represented as follows.

An information processing device including:
a storage device; and
a hardware processor which executes a program stored in the storage device,
the hardware processor is configured to, by executing the program:
generate a distortion-corrected equivalent image on the basis of a first captured image including a subject having predetermined distortion generated due to optical operations during imaging;
generate first teacher data in which relevant information about a target object has been added for the equivalent image in which an image region for the target object has been designated;
convert the equivalent image included in the first teacher data into a distorted image having predetermined distortion to generate second teacher data; and
generate a learning model which outputs a result obtained by identifying the target object included in a second captured image when the second captured image having predetermined distortion generated therein is input, on the basis of the second teacher data.

Although aspects for implementing the present invention have been described using embodiments, the present invention is not limited to such embodiments and various modifications and substitutions can be made without departing from the spirit or scope of the present invention.

Figure 5:
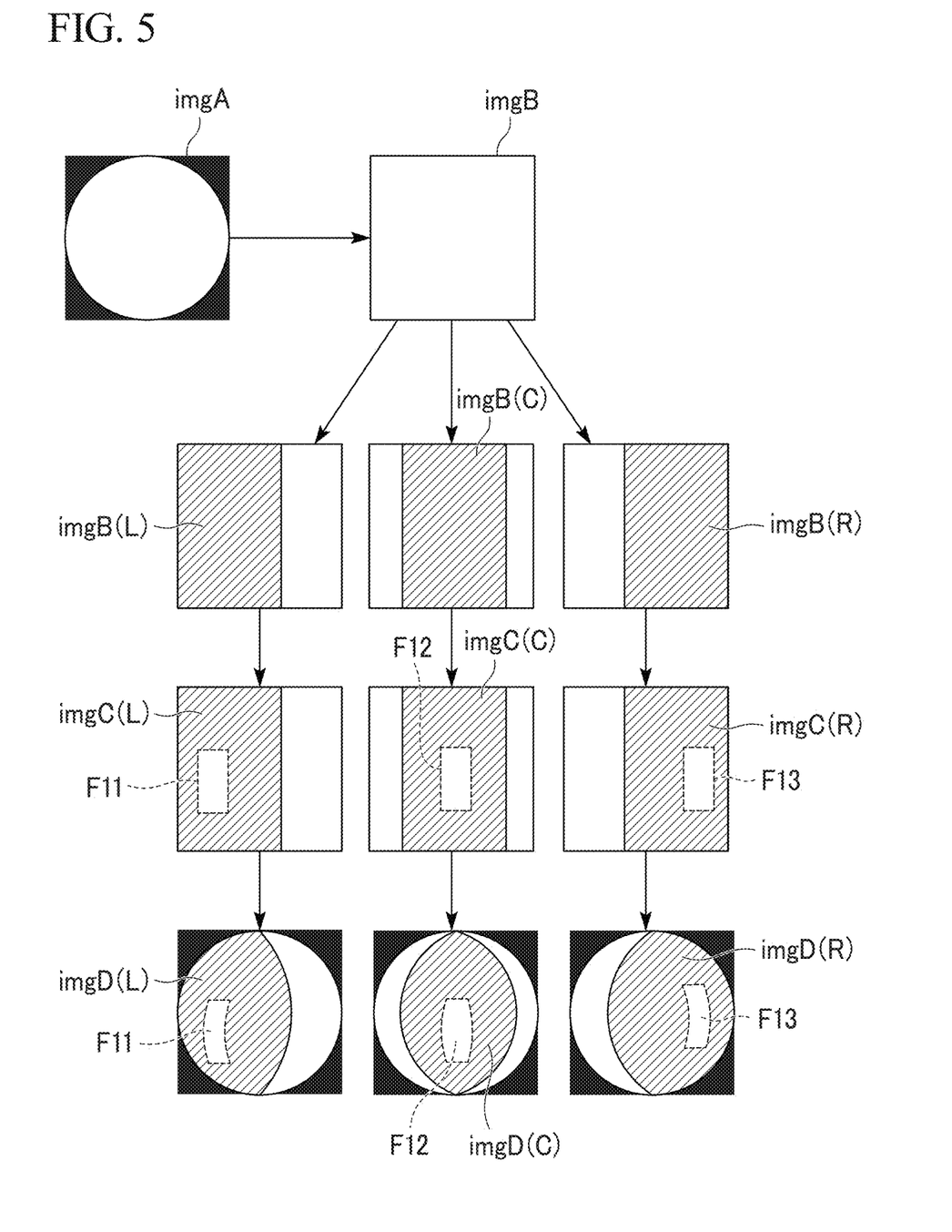
FIG. 5 is a reference diagram for explaining an example when a learning model is generated for each separate region.

For example, the learning processing device 100 may segment an equivalent image into predetermined regions and generate a learning model for each separate region. FIG. 5 is a reference diagram for explaining an example when a learning model is generated for each separate region. As shown in FIG. 5, the image corrector 112 corrects distortion of a captured image imgA to generate an equivalent image imgB. The image corrector 112 segments the equivalent image imgB into predetermined separate regions to generate a plurality of equivalent images imgB(L), imgB(C) and imgB(R). The equivalent image imgB(L) is an image including a left region (hereinafter, first region) of the equivalent image imgB, the equivalent image imgB(C) is an image including the center portion (hereinafter, second region) of the equivalent image imgB and the equivalent image imgB (R) is an image including a right region (hereinafter, third region) of the equivalent image imgB. The object detector 113 detects a target object from each of the equivalent images imgB(L), imgB(C) and imgB(R).

In addition, the first teacher data generator 114 generates first teacher data on the basis of each of the equivalent images imgB(L), imgB(C) and imgB(R). For example, the first teacher data generator 114 may set frames F11, F12 and F13 such that the frames F11, F12 and F13 surround detected target objects to generate framed equivalent images imgC(L), imgC(C) and imgC(R) and annotation information about each target object, to thereby generate first teacher data. The second teacher data generator 115 converts the framed equivalent images imgC(L), imgC(C), imgC(R) into distorted images imgD(L), imgD(C) and imgD(R) having predetermined distortion to generate second teacher data. The learning model generator 116 generates a first learning model on the basis of the distorted image imgD(L), generates a second learning model on the basis of the distorted image imgD(C) and generates a third learning model on the basis of the distorted image imgD(R). In addition, the object recognition device 200 performs object recognition on the first region of the captured image using the first learning model. The object recognition device 200 performs object recognition on the second region of the captured image using the second learning model and performs object recognition on the third region of the captured image using the third learning model. In this manner, learning accuracy can be further improved.

The imager which captures an image having predetermined distortion generated therein may be a camera including a wide-angle lens or a fisheye lens, for example, and may include a lens having different compression ratios according to positions in an image. The image corrector 112 performs a correction process for equalizing such compression ratios.

What is claimed is:

1. An information processing device causing a computer to:
   generate a distortion-corrected equivalent image on the basis of a first captured image including a subject having predetermined distortion generated due to optical operations during imaging;
   generate first teacher data in which relevant information about a target object has been added for the equivalent image in which an image region for the target object has been designated;
   convert the equivalent image included in the first teacher data into a distorted image having predetermined distortion to generate second teacher data; and
   generate a learning model which outputs a result obtained by identifying the target object included in a second captured image when the second captured image having predetermined distortion generated therein is input, on the basis of the second teacher data.

2. The information processing device according to claim 1, wherein the first captured image and the second captured image are images captured by an imager including a fisheye lens.

3. The information processing device according to claim 1, further causing the computer to surround the image region of the target object with a rectangular frame to designate the image region corresponding to the target object.

4. The information processing device according to claim 3, further causing the computer to convert the equivalent image included in the first teacher data into the distorted image and to convert the shape of the rectangular frame into a shape having distortion according to the position on the equivalent image at which the rectangular frame has been designated when the second teacher data is generated.

5. A learning processing method executed by a computer, comprising:
   generating a distortion-corrected equivalent image on the basis of a first captured image including a subject having predetermined distortion generated due to optical operations during imaging;
   generating first teacher data in which relevant information about a target object has been added for the equivalent image in which an image region for the target object has been designated;
   converting the equivalent image included in the first teacher data into a distorted image having predetermined distortion to generate second teacher data; and
   generating a learning model which outputs a result obtained by identifying the target object included in a second captured image when the second captured image having predetermined distortion generated therein is input, on the basis of the second teacher data.

6. A learning device comprising:
   an image corrector which generates a distortion-corrected equivalent image on the basis of a first captured image including a subject having predetermined distortion generated due to optical operations during imaging;
   a first teacher data generator which generates first teacher data in which relevant information about a target object has been added for the equivalent image in which an image region for the target object has been designated;
   a second teacher data generator which converts the equivalent image included in the first teacher data into a distorted image having predetermined distortion to generate second teacher data; and
   a learning model generator which generates a learning model which outputs a result obtained by identifying the target object included in a second captured image when the second captured image having the predetermined distortion generated therein is input, on the basis of the second teacher data.

7. An object recognition device which recognizes an object using a learning model generated by a computer which:
   generates the distortion-corrected equivalent image on the basis of a first captured image including a subject having predetermined distortion generated due to optical operations during imaging;
   generates first teacher data in which relevant information about the target object has been added for the equivalent image in which an image region for the target object has been designated;
   converts the equivalent image included in the first teacher data into a distorted image having predetermined distortion to generate second teacher data; and
   generates the learning model which outputs a result obtained by identifying the target object included in a second captured image when the second captured image having predetermined distortion generated therein is input, on the basis of the second teacher data.

8. The object recognition device according to claim 7, further comprising a recognizer which recognizes the target object included in a third captured image captured by an imager in which the predetermined distortion is generated on the basis of the third captured image having distortion that has not been corrected.

* * * * *